Aug. 13, 1968   S. B. FERGUSON   3,396,764
SHAKE BOARD-MAKING MACHINE AND SHAKE BOARD-MAKING
PROCESS AND PRODUCT
Filed July 25, 1966   5 Sheets-Sheet 5

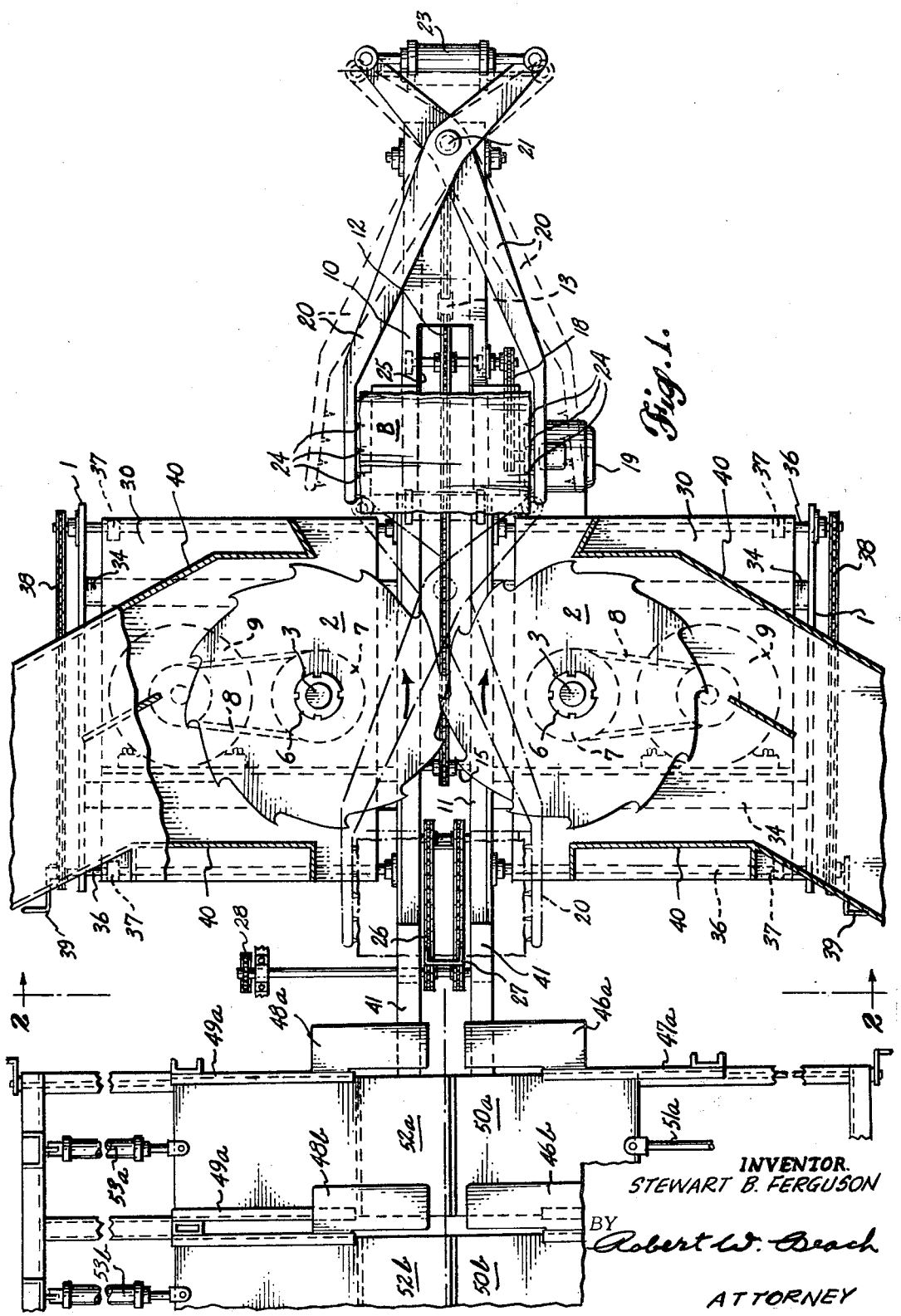

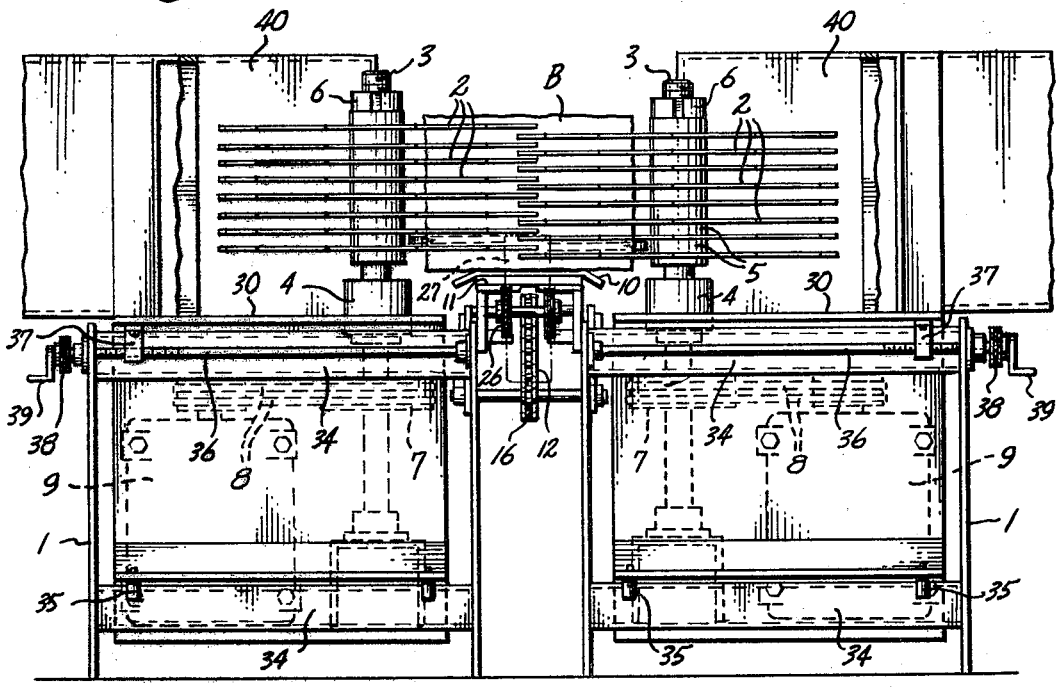
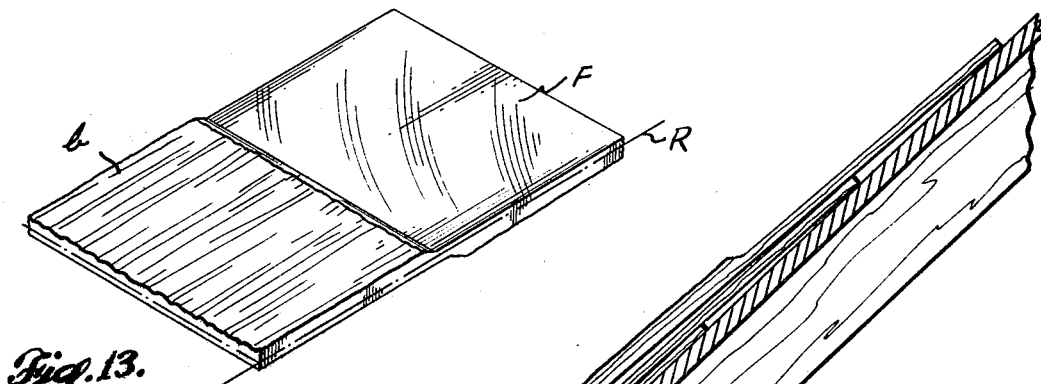
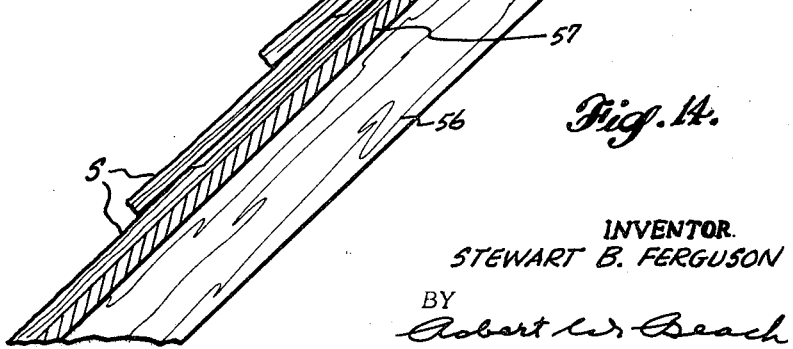

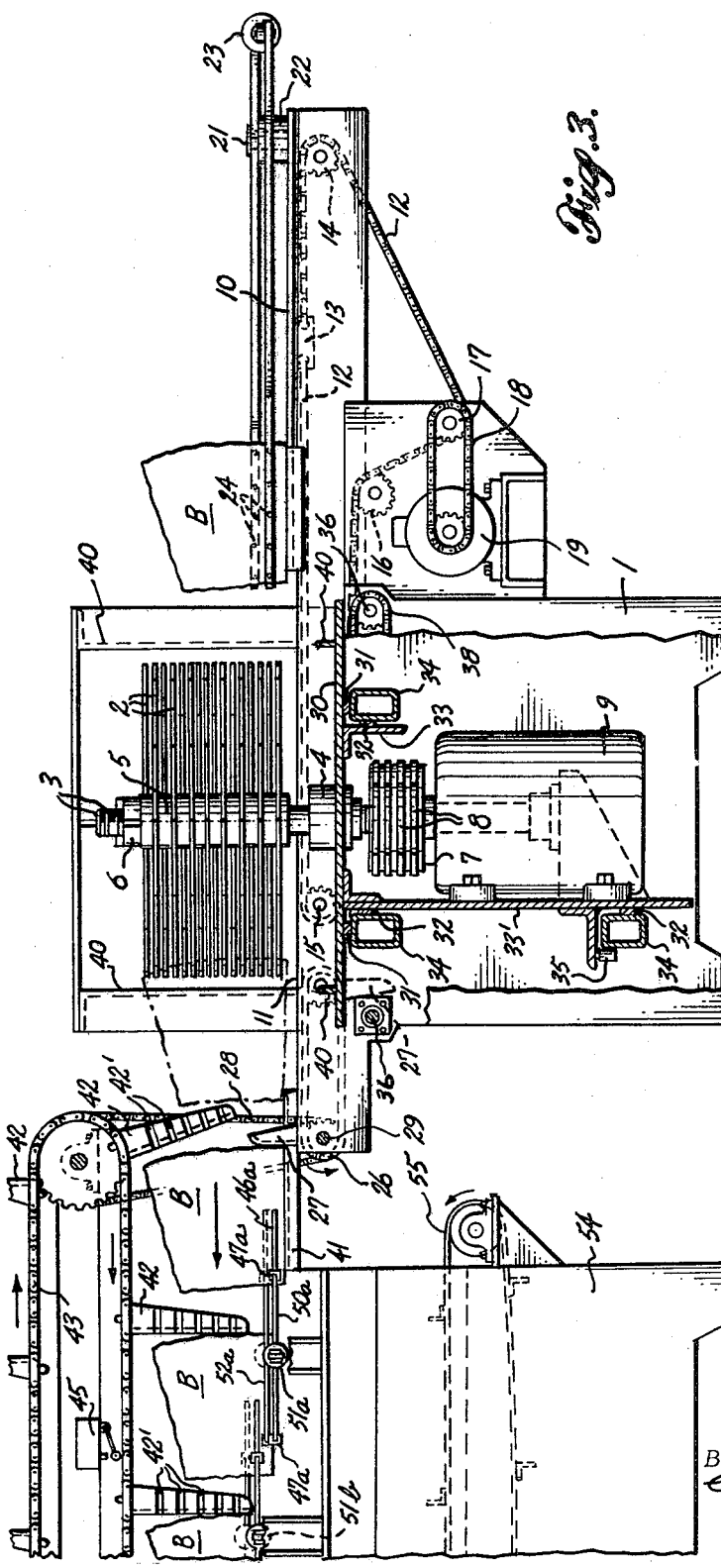
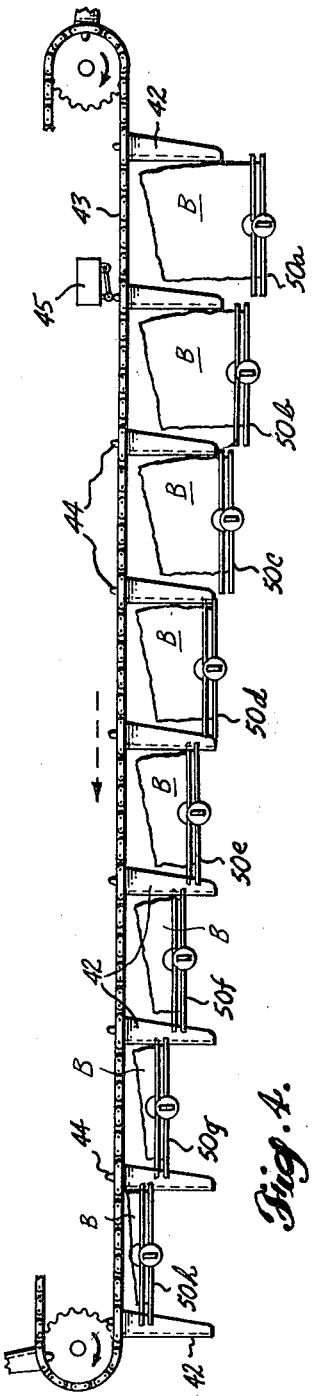

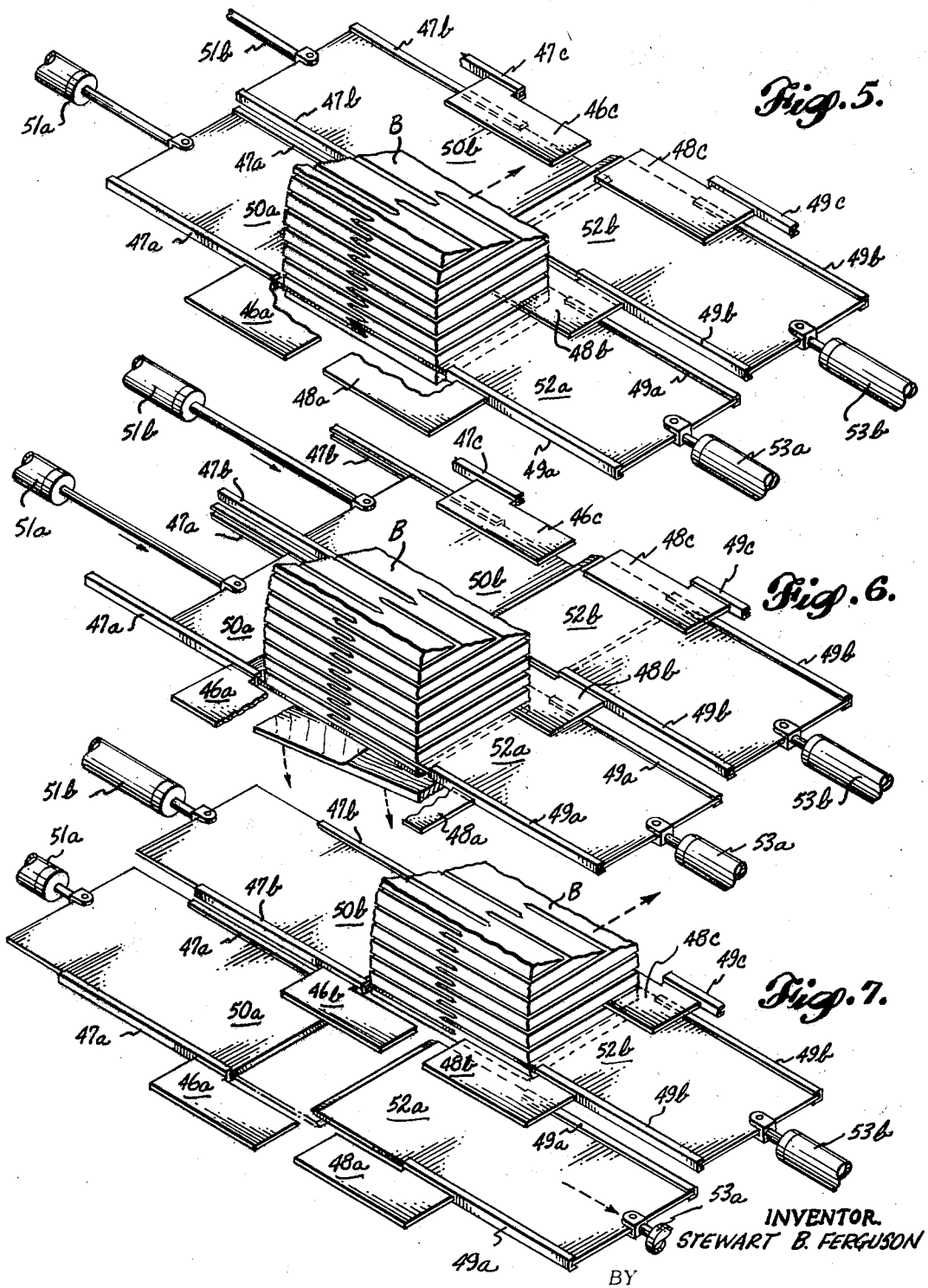

INVENTOR.
STEWART B. FERGUSON
BY
Robert W. Beach
ATTORNEY

United States Patent Office
3,396,764
Patented Aug. 13, 1968

3,396,764
SHAKE BOARD-MAKING MACHINE AND SHAKE
BOARD-MAKING PROCESS AND PRODUCT
Stewart B. Ferguson, P.O. Box 12,
Aloha, Wash. 98525
Filed July 25, 1966, Ser. No. 567,581
20 Claims. (Cl. 144—326)

This invention relates to a machine for making boards from blocks, which boards have generally parallel sides and which are of a thickness sufficiently great to enable the board to be resawn on an angle to make two shakes tapered from butt to tip.

In the past it has been customary to split blocks of western red cedar or of redwood by hand to provide what is known in the trade as a "hand-split shake." These shakes in some instances are of substantially uniform thickness from end to end, but in other instances they are tapered from butt to tip. An increasingly more common type of split shake is made by splitting a block by hand into boards of substantially uniform thickness from end to end, which thickness is sufficiently great so that the boards can be resawn on an angle to make two tapered shakes having a split face and a sawn back. This invention is particularly concerned with the production of shake boards of substantially uniform thickness, which can be cut substantially on a diagonal to produce two resawn shakes.

Timber suitable for the production of split shakes as distinguished from sawn shingles is becoming scarcer and of poorer quality. In the past blocks from which shakes were to be split were selected to be free of knots and to have straight grain. The presence of knots deterred splitting of shake blocks, and twisted grain caused a split to progress along the grain to produce a twisted shake which was hard to lay. Also knots arranged so that their lengths extend generally parallel to the plane of cleavage prevent a planar spit because the grain curves around the knot so that, not only is the portion of a block containing the knot lost, but previously a substantial thickness on each side of the knot was unsuitable to use because of the curvature of the grain causing a cleavage which was not planar.

The principal object of the present invention, therefore, is to provide a machine and process for making acceptable shake boards from blocks which in the past have been considered to be unsuitable for making shakes or shake boards.

More specifically, it is an object to provide such a machine and process which will make shake boards that when resawn will have sawn tip portions, and each butt will have one naturally split face. It is preferred that the split portion of a shake board side be a minor portion of the entire area of such side.

Another object is to provide a shake board-making machine which can produce shakes of more uniform thickness and quality while preserving the artistic rustic, split appearance on that portion of the shake which is exposed to view on a roof or side wall.

Another object is to provide a shake board-making machine which can produce shake boards rapidly and substantially automatically with a minimum of handling and supervision by an operator.

A further object is to provide a shake board-making machine which can be used to make shake boards of different lengths and which can be adjusted easily and quickly to accommodate blocks of different lengths from which such shake boards can be made.

In addition, it is an object to provide a shake board-making machine which can produce shake boards from blocks of different widths and thicknesses within reasonable limits without requiring any adjustment of the machine.

It is also an object to provide such a shake board-making machine which is of rugged construction, reliable in operation, and which will require a minimum of maintenance.

The foregoing objects can be accomplished by a shake board-making machine having two cooperating circular ripsaw gangs disposed in adjacent relationship and preferably with the saws of the two gangs interdigitated, or at least with the saws of the two gangs alternating in spatial relationship. A block-feeding carriage and locating tongs moves a block through the saw gangs to saw kerfs in the opposite ends of the block in alternating arrangement. A transfer chain moves the block from the sawing station to the splitting section, providing a number of splitting stations. Feed means move the block intermittently, step-by-step, from one splitting station to the next. At each splitting station two splitting plates engage in the respective kerfs adjacent to the bottom of the block and are sequentially reciprocated beyond the bottoms of the two kerfs to split two shake boards from the block bottom, which boards drop onto a conveyor for removing them from the machine.

FIGURE 1 is a plan of the sawing section and the adjacent portion of the splitting section of the machine with parts broken away.

FIGURE 2 is a vertical transverse section through the machine on line 2—2 of FIGURE 1, parts being broken away.

FIGURE 3 is a side elevation of the sawing section and an adjacent portion of the splitting section of the machine with parts broken away.

FIGURE 4 is a somewhat diagrammatic side elevation of the splitting section of the machine.

FIGURES 5, 6 and 7 are somewhat diagrammatic top perspectives of adjacent splitting stations, with parts shown in different positions in the several figures.

FIGURE 13 is a top perspective of such a shake board.

FIGURE 14 is an end elevation of a roof on which shakes resawn from shake boards of the present invention have been laid.

Figure 12:
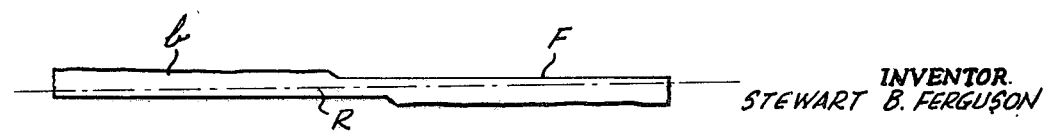
FIGURE 12 is an edge elevation of a representative shake board of the type made by the machine of this invention.

The machine of the present invention produces shake boards *b* of the type shown in FIGURES 12 and 13 from blocks B of the general type shown in FIGURES 1 and 3. It will be seen that the minor portion of each side of the shake board is split and the major portion of each principal face F is sawn. Moreover, the split portion of one face is located in registry with the sawn portion of the opposite face. When such a shake board is resawn along a generally diagonal plane R of the shake board, the opposite sides of the shake board tip will have sawn surfaces, and one side of the butt will have a split surface and the other side will have a sawn surface.

The first section of the machine in which the block is processed is the sawing section shown principally in FIGURES 1, 2 and 3. In this section are mounted two cooperating gangs of circular saws 2. These saws are mounted to cut kerfs in opposite ends of the block B in staggered arrangement. Consequently, each saw 2 is a rip-saw, and in each gang the saws are mounted in spaced relationship on an arbor 3. Each arbor is supported in vertical position by a bearing 4 mounted on the frame structure of the sawing section. The saws in each gang are held in spaced relationship by collars 5 interposed between them. Each gang assembly is secured on its arbor by a nut 6.

Each of the arbors 3 carries a drive pulley 7 on its lower end driven by a plurality of V-belts 8, which in turn are driven by a motor 9. As seen best in FIGURE 2, the saws 2 are mounted on their arbors 3 and the arbors are supported by their bearings 4 in a relationship such that the peripheral portions of the saws which are nearest to each other are disposed in interdigitated, overlapping arrangement. The spacing between adjacent saws on each arbor, as established by the thickness of the collars 5, will determine the general thickness of each shake board.

The shake blocks B are fed to and through the gangs of circular saws 2 by movement of a block-carrying carriage 10 slidable on ways 11, shown in FIGURES 1 and 3. Feed and return movement of the carriage is effected by a chain 12 incorporating a connecting lock 13, which is secured by bolts or other fastening devices to the carriage. The upper stretch of chain 12 extends between upper sprockets 14 and 15 to locate the chain immediately below and parallel to the guideways 11 for carriage 10. The lower portion of this chain extends around the guide sprocket 16 and the drive sprocket 17. Such drive sprocket is powered by a chain-and-sprocket drive 18 which is driven by motor 19.

The block B is placed on the carriage 10 by the operator with the length of its grain extending transversely of the direction of movement of the carriage along the ways 11. In order for the block to be fed smoothly completely through the gang of saws, the side of the block which rests on the carriage should be quite flat and the block should be held securely on the carriage in opposition to the force exerted by the saws 2 on it in cutting the kerfs in its opposite ends.

Block-gripping or block-securing means for holding the block B on the carriage are shown in FIGURES 1 and 3 in the form of tongs including two crossed legs 20, which are secured together and mounted for relative swinging by a pivot 21 mounted on the carriage 10. The legs 20 of these tongs are mounted by the pivot in relationship spaced lengthwise of the pivot so that the respective legs will be in registry with spaces between adjacent saws 2 of the saw gangs, respectively. Such spacing of the two legs 20 is accomplished by separating them by a spacer washer 22 mounted on the pivot 21. The lower leg 20 is held in properly spaced relationship to the carriage 10 by a spacer washer 22' between such carriage and such lower leg which also encircles the pivot 21.

Since the tongs are definely positioned relative to the carriage 10 by the tongs pivot 21 being mounted on the carriage, movement of the block B in synchronism with movement of the carriage can be assured by gripping such block with the tongs in a manner to prevent movement of the block relative to the tongs. The legs 20 of the tongs can be swung from the open broken-line position shown in FIGURE 1 to the closed gripping position shown in solid lines in that figure by the fluid pressure actuated piston and cylinder or jack 23 reacting between the ends of the tong legs remote from the block-engaging ends. Spikes 24 can be provided on the block-engaging ends of the legs to grip the block positively when the tongs are closed.

It would be possible to provide suitable means to prevent the tongs from swinging about pivot 21 relative to the carriage 10 while the tongs are gripping the block B, but since the kerfs are being cut by the saws 2 in both ends of the block simultaneously, there will be no appreciable preassure exerted by the sawing operation to swing the tongs out of the centered position established by the operator at the beginning of the sawing operation. Consequently, the block should be carried through the sawing section along a true linear path by carriage and tongs. The forward end of the carriage has in it a deep notch 25 to receive transfer unit between the sawing section and the splitting section of the machine as the carriage nears the end of its forward stroke. When such stroke is completed the motor 19 can be reversed to return the carriage from the broken-line position shown in FIGURES 1 and 3 into the solid-line position again.

Prior to return movement of the carriage 10 to the solid-line position of FIGURES 1 and 3, the transfer unit should have moved the block B into the splitting section of the machine. Such transfer unit includes two transfer chains 26 extending in continuation of the path of movement of the block through the sawing section of the machine and carrying block-pushing dogs 27. Such transfer chains are driven by a drive chain 28 connected between the splitting section of the machine and the transfer chain shaft 29 to synchronize the movement of a block on the transfer unit with movement of blocks through the splitting section of the machine.

It is desirable for the shake board-making machine of the present invention to be able to process blocks of different lengths for making shake boards of different lengths. It may be desirable to make shake boards of various lengths from eighteen inches to twenty-eight inches. To accommodate blocks of different lengths either using saws 2 of the same size or of different sizes, provision is made for altering the spacing of the arbors 3. In changing the spacing such arbors should remain spaced equidistantly from the center of the path of movement of the carriage 10. Adjusting mechanism is therefore provided which will alter the positions of both spindles 3 simultaneously and to the same degree toward and away from each other.

It is preferred that each of the saw gangs be mounted on a platform 30 on the underside of which are mounted supporting shoes 31. Guide shoes 32 are mounted on plate members 33 and 33' projecting downward a substantial distance from each plate 30. These shoes engage three rails 34 which are mounted on the machine base 1 with their lengths extending transversely of the direction of travel of carriage 10. As shown in FIGURE 3, two of these rails are located close beneath the plates 30, and the other rail is located a substantial distance below such plate and adjacent to the lower edge of the upright plate 33'. The upper two rails with which the shoes 31 engage support the weight of the movable saw assemblies, while a roller 35 engages the side of the lower rail opposite that engaged by the shoe 32 to hold the assembly against tilting.

Shafts 36 are carried by the machine base 1 adjacent to opposite edges of the plates 30. These shafts are screw-threaded for engagement with nuts 37 mounted on the undersides of the plates 30. Such threaded shafts may extend entirely through from side to side of the machine, or such shafts may be separate on each side of the machine, as shown in FIGURE 1. The outer ends of the shafts are connected by a chain-and-sprocket drive 38 and a crank handle 39 is mounted on one of the shafts. By rotation of such crank both screw shafts 36 on the same side of the machine can be rotated to slide the plate 30 and the saw gang carried by it toward or away from the carriage-supporting ways 11. As shown in FIGURE 3, the driving motor 9 for one of the saw gangs is mounted on the downwardly projecting plate 33'. If the plates 30 at opposite sides of the machine are shiftable independently, care should be taken to locate each arbor 3 the same distance from the center of the sawing section when the spacing of the saw arbors is adjusted.

In addition to constituting a mount for a saw gang arbor and its drive, each plate 30 has mounted on it a hood 40, shown in FIGURES 1, 2 and 3, which extend over the saw gang carried by the respective plates 30 as fas as possible without interfering with movement of a block B through the sawing section. A source of suction may be connected to such hood so that most of the sawdust produced by the sawing operation will be drawn into the hood and removed from the sawing section. By mounting these hoods on the saw gang supporting plates 30 such hoods maintain a constant relationship to the saw gangs.

When the transfer unit dogs 27 push a sawn block toward the splitting section of the machine, such block will be moved into a space between adjacent overhead pusher arms 42 which are mounted on a feed chain 43 traveling throughout the length of the block-splitting section of the machine. As has been discussed above, the movement of the transfer unit chains 26 is coordinated with movement of chain 43 carrying the pusher arms, so that as a pusher arm continues downwardly and forwardly behind a block B, as shown at the left of FIGURE 3, such arm will continue movement of the block at the same rate that it was being moved by engagement of a transfer unit dog 27 with it.

As shown in FIGURES 3 and 4, blocks B are lodged between each pair of adjacent overhead pusher arms 42. By such arms the blocks in the splitting section of the machine are all advanced simultaneously from one splitting station to the next, and at each splitting station the splitting mechanism is operated to split from the bottom of the block two shake boards. As each block is processed through the splitting section of the machine, therefore, its thickness will be reduced progressively by the thickness of two shake boards from station to station.

In order to split two shake boards from each block at each station the feed chain 43 is stopped periodically so that the blocks dwell at the several stations while the splitting operation occurs. The feed conveyor is then started again so that the pusher arms 42 move each block to the next station where the splitting operation is repeated. Automatic control mechanism is provided to interrupt movement of the feed chain automatically when the pusher arms reach positions for locating the several blocks in proper positions at the respective splitting stations. Such interruption of chain movement is effected by engagement of successive knobs 44 on the feed chain with the switch arm of a normally closed switch 45 to open such switch for breaking the circuit of the motor driving the feed chain 43. After the splitting operations have been completed at all of the stations, the switch 45 is bypassed to reenergize the drive for chain 43 so that it will continue to move until the next knob 44 engages the arm of switch 45 to break the motor circuit again.

All of the stations of the block-splitting section of the machine are the same except that the splitting mechanism at the several stations are located at different elevations, as shown best in FIGURE 4. The splitting section of the machine is arranged to move a block through such section at the same elevation, and the splitting mechanism at each station is higher than the splitting mechanism at the next preceding station by the thickness of two shake boards and is lower than the splitting mechanism at the next following station by the thickness of two boards. The splitting mechanism as such, however, is the same at each station, and consequently a representative type of splitting mechanism from one station is shown in FIGURES 5 to 11, inclusive, and FIGURES 5 to 7, inclusive, show the relationship of the splitting mechanisms at two adjacent stations. because the splitting mechanisms at the various stations are the same, the corresponding parts of the several splitting mechanisms are identified by corresponding numbers.

The elevation of the transfer unit chains 26 is such that, as a block is pushed from its transfer unit to the first station of the block-splitting section by a dog 27, the lowermost kerf of the block will embrace the projecting end of registry plate 46a, which is supported in cantilever fashion from a guide channel 47a. From such guide channel the registry plate projects toward the sawing section of the machine and also toward the center of the block-splitting section of the machine. Simultaneously the next to the bottom kerf in the block which extends inwardly from the end of the block opposite the bottom kerf embraces the projecting end of registry plate 48a, which is supported in cantilever fashion by a stationary guide channel 49a. This registry plate also projects toward the sawing section of the machine and toward the center of the block-splitting section from such guide channel, as shown best in FIGURES 1 and 7.

A splitting plate 50a, shown in FIGURES 5 to 11, is guided for reciprocation transversely of the direction of movement of a block B through the splitting section of the machine by having its opposite edges received in guide channels 47a. Reciprocation of such plate is effected by a fluid pressure piston and cylinder 51a which preferably is air operated. Similarly, splitting plate 52a at the opposite side of the splitting section of the machine is guided for reciprocation in a direction transversely of the direction of movement of a block B through the splitting section by its opposite edges being received in guide channels 49a. Reciprocation of this plate is effected by a fluid pressure piston and cylinder actuator 53a.

Figure 8:
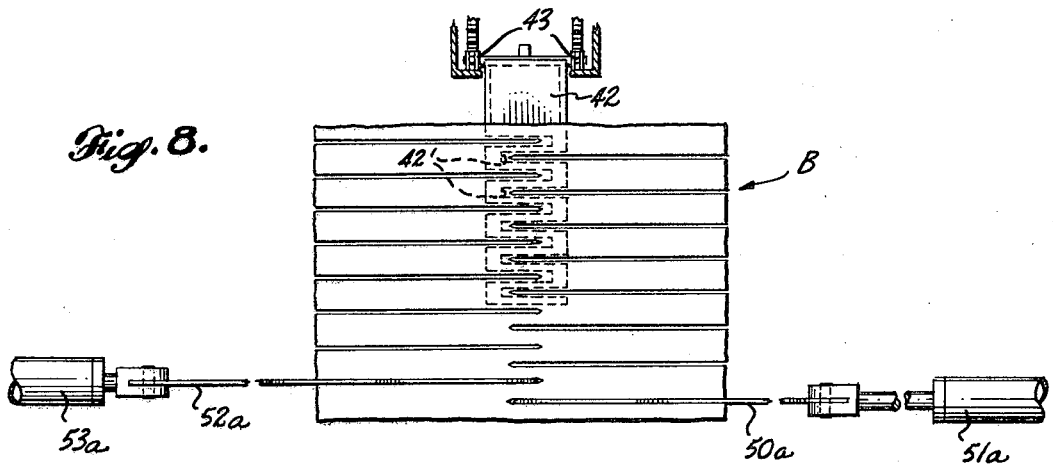
FIGURES 8, 9, 10 and 11 are somewhat diagrammatic vertical transverse sections through the splitting section of the machine and illustrating sequential steps in a splitting operation.
Figure 9:
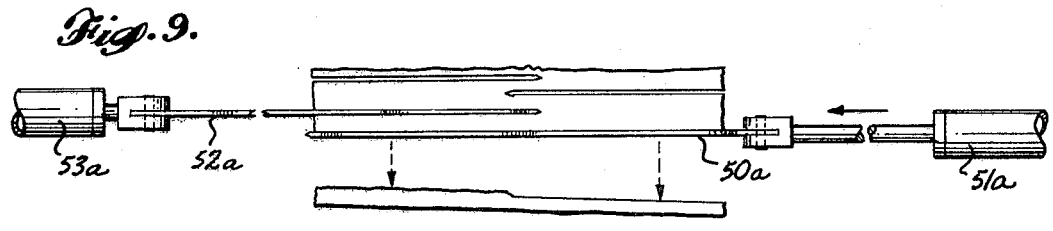

FIGURES 5 and 8 represent the relative positions of the splitting plates 50a and 52a, as seen from opposite sides of the first splitting station, when the block is first moved into the station. It will be seen that the inner ends of these plates extend almost to the bottoms of the kerfs formed in the opposite ends of the block at the cutting station. The first step of the splitting operation is then to operate the actuator 51a for projecting the splitting plate 50a from the position of FIGURES 5 and 8 to the position of FIGURES 6 and 9. The reciprocation of the splitting plate should be sufficient to move its inner end to or almost to the opposite end of the block B so that the lowest shake board will be split positively from the bottom of the block, as indicated in FIGURES 6 and 9.

Figure 10:
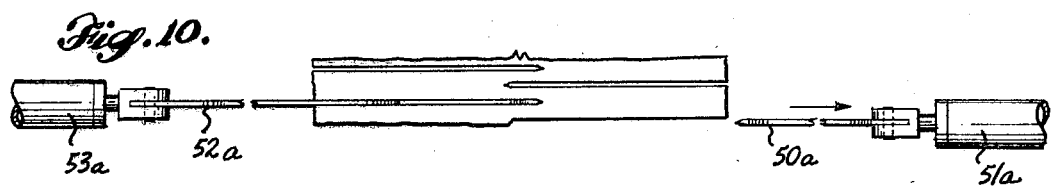
Figure 11:
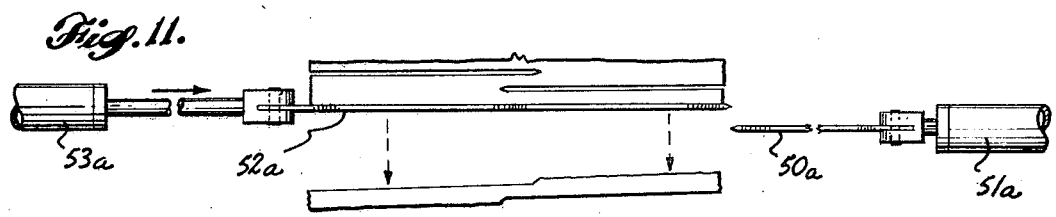

The next step in the splitting operation is to reverse the supply of fluid to the actuator 51a so that the splitting plate 50a will be withdrawn completely from registry with the block. When the next-to-the-bottom shake board is split from the bottom of the block, it can therefore drop freely without striking the splitting plate 50a. This position of the splitting plate is shown in FIGURES 7 and 10. While the plate 50a is retained in this position, the next step in the operating procedure is to project the other splitting plate 52a so that its inner end is moved from the central portion of the block, as shown in FIGURES 8, 9 and 10, to, or at least almost to, the opposite end of the block as shown in FIGURE 11, so as to sever the next shake board from the block, as indicated in this figure. The splitting operation is completed by operating the actuator 51a to project splitting plate 50a from the position of FIGURE 11 to the position of FIGURES 5 and 8 where the inner end of the splitting plate is located generally centrally of the block B, and the actuator 53a is operated to withdraw the upper splitting plate 52a to the position of FIGURES 5 and 8 where its inner end also is located generally centrally of the block.

It will be noted from FIGURE 5 that, when the block B having kerfs cut in its opposite ends has been moved into registry with the first splitting station, the kerfs next above those with which the splitting plates 50a and 52a have been engaged will be engaged with projecting portions of the registry plates 46b and 48b. Such engagement of the registry plates will assist plate 52a and the pusher arm 42 engaged with the block in supporting the block nad preventing it from tilting when the lower splitting plate has been withdrawn from engagement with the block to the position shown in FIGURE 10. The upper splitting plate of each pair is never withdrawn more than about half the length of the block, as indicated in FIGURE 10. Such engagement of the registry plates 46b and 48b also guides the block during its movement from the station where the splitting operation has been completed to the next station.

FIGURE 7 shows a block B in the second station of the block-splitting section, while FIGURES 5 and 6 show such a block only in the first station. It should be understood, however, that except where operation of the machine is being started there would be a block at least in most of the stations, as indicated in FIGURE 4. Also, a block would be in the second station, as shown in FIGURE 7, with no block in the first station only when operation of the machine is being terminated. The additional blocks are omitted from FIGURES 5, 6 and 7, however, to reveal more of the machine structure. It will thus be evident from FIGURE 7 that the plates 46b and 48b which are in registry with splitting plates 50b and 52b, respectively, will guide a block for movement from the first station to the second station effected by a pusher arm 42. During such movement the kerfs next above those embracing the splitting plates 50b and 52b will engage the registry plates 46c and 48c which are in registry with the splitting plates 50c and 52c of the third splitting station.

The splitting operation described above will occur at all of the splitting stations at the same time. Thus, all of the actuators 51a, 51b, 51c, etc. will be operated simultaneously to reciprocate their respective splitting plates 50a, 50b, 50c, etc. Similarly, all of the actuators 53a, 53b, 53c, etc. will be operated simultaneously to reciprocate the plates 52a, 52b, 52c, etc. The overhead pusher arms 42 must be long enough to advance the thinnest block B from one station to the next as far as necessary to split the entire block. At the same time the lower stretch of feed chain 43 must be spaced above the rails 41, as shown in FIGURE 3, far enough to accommodate between such rails and the feed chain a block of the maximum height to be accommodated in the machine. Consequently, the pusher arms 42 should be quite long.

Because of the length of the pusher arms 42 and the location of the inner edges of the splitting plates generally centrally of the blocks when they are shifted from station to station, each pusher arm has deep nocthes 42' in its opposite sides, as indicated in FIGURES 3 and 8, for the purpose of passing the inner end portions of the splitting plates as the arms are moved through the splitting section of the machine by the feed chain 43.

The base 54 of the splitting section of the machine is hollow, and a conveyor 55 extends through such hollow base beneath the splitting stations to catch shake boards which are severed from the block in the manner described. These shake boards will be transported by such conveyor to a location for resawing along a plane indicated by the line R in FIGURE 13, or such shake boards can be stored for resawing later. The resulting shakes can then be applied to a roof composed, for example, of rafters 56 covered by sheathing 57 on which the shakes S are nailed in ovrelapping relationship, as shown in FIGURE 14.

The operation of the shake board-making machine can be semi-automatic. A cycle of operation of the machine should be initiated only by a positive action of the operator after he has placed a fresh block on the carriage 10. Such positive action could be the pressing of a start switch or stepping on a start pedal. The machine could then proceed through a complete cycle of operation and come to a stop until the operator places the next block on the carriage 10 and initiates the next operating cycle. The steps of each cycle could then occur automatically in sequence by the provision of appropriate automatic sequencing mechanism.

When the operator actuates the start switch the following cycle of operations occurs involving steps listed in sequence:

Actuator 23 is expanded to close the tongs.

Motor 19 is energized to drive carriage 10 forward.

A limit switch engaged by the carriage 10 deenergizes motor 19, operates actuator 23 in reverse for opening the tongs, and starts transfer chains 26 and feed chain 43.

A button 44 actuates switch 45 to stop feed chain 43 and transfer chain 26, to energize motor 19 in reverse for returning carriage 10 to its starting position, and to energize actuators 51a, 51b, 51c, etc. to project the splitting plates 50a, 50b, 50c, etc.

A limit switch stops the carriage in its retracted position.

A switch actuated by projection of the lower splitting plates operates actuators 51a, 51b, 51c, etc. to effect reverse reciprocation of splitting plates 50a, 50b, 50c, etc. to the fully retracted position of FIGURES 10 and 11.

Movement of the lower splitting plates into fully retracted position operates actuators 53a, 53b, 53c, etc. to project splitting plates 52a, 52b, 52c, etc. from the position of FIGURE 10 to the position of FIGURE 11.

Projection of the upper splitting plates operates a switch to reverse the operation of actuators 53a, 53b, 53c, etc. to move the upper splitting plates from the position of FIGURE 11 to that of FIGURE 10 and operates the actuators 51a, 51b, 51c, etc. to project the splitting plates 50a, 50b, 50c, etc. from the position of FIGURES 10 and 11 to the position of FIGURES 7 and 8.

The various drives and actuators then remain inoperative until the operator has placed the next block on the carriage 10 and closed the start switch. Motors 9 driving the saw gangs operate continuously and would be placed in operation by their own starter switches.

I claim as my invention:

1. A shake board-making machine comprising gang sawing means for sawing kerfs in opposite ends of a block in staggered relationship, and block-splitting means engageable in the kerfs and operable to split the block into shake boards along cleavage zones generally in continuation of the saw kerfs.

2. The machine defined in claim 1, in which the sawing means includes two gangs of circular saws.

3. The machine defined in claim 2, in which the saws of the two gangs are interdigitated.

4. The machine defined in claim 2, in which the saws of each gang are mounted on a saw arbor and said saw arbors are upright.

5. The machine defined in claim 2, in which the saws of each gang are mounted on an arbor, and means for varying the spacing between said saw arbors.

6. The machine defined in claim 2, means supporting the two saw gangs in adjacent relationship, and means for feeding a block relative to the two gangs of saws in a direction to cut its opposite ends by such saw gangs.

7. The machine defined in claim 6, in which the feeding means includes tongs for feeding a block held thereby to the saw gangs.

8. The machine defined in claim 7, in which the tongs include pivoted legs which are offset axially of the pivot axis.

9. The machine defined in claim 6, in which the block-feeding means includes a carriage for transporting a block relative to the saw gangs.

10. The machine defined in claim 9, in which the feeding means includes tongs mounted on the carriage and having legs of a thickness less than the spacing between adjacent saws of the saw gangs to be moved between such adjacent saws by movement of the carriage while gripping a block.

11. The machine defined in claim 1, in which the block-splitting means are operable to split boards successively from the sawn block.

12. The machine defined in claim 1, in which the block-splitting means splits successive boards from the block alternately from opposite ends of the block.

13. The machine defined in claim 1, in which the block-splitting means includes a plate engageable in a saw kerf and means operable to move said plate relative to the block for splitting a board therefrom.

14. The machine defined in claim 1, in which the block-splitting means includes a plurality of successive splitting stations, and a plurality of block-splitting members corresponding to and located at said respective stations for splitting successive boards from a single block at said successive stations respectively.

15. The machine defined in claim 14, and means for moving a block step-by-step from one station to successive stations.

16. The machine defined in claim 14, in which the block-splitting means includes opposed splitting members at each station engageable in kerfs at opposite ends of a block, respectively, and movable relative to such block for splitting a board successively from each end of the block at a selected splitting station.

17. The machine defined in claim 15, and guide means engageable in a kerf of a block at one station and guiding said block for movement to the next station into a predetermined splitting position.

18. The process of making shake boards from a block which comprises simultaneously sawing a plurality of kerfs in opposite ends of the block in parallel planes, which kerfs at opposite ends of the block are in staggered relationshipp, and exerting a splitting force in such kerfs to form splits from the bottoms of the kerfs to the opposite end of the block and thereby dividing the block into shake boards along such kerfs and splits.

19. The process defined in claim 18, in which each kerf extends inward from an end of the block to approximately the central portion of the block.

20. The process defined in claim 18, in which each kerf extends from an end of the block inward for a distance greater than half the length of the block.

References Cited

UNITED STATES PATENTS

| | | | |
|---|---|---|---|
| 3,315,717 | 4/1967 | Hughes | 144—326 |
| 587,215 | 7/1897 | Kruger | 143—8 |
| 383,955 | 6/1888 | Knauss | 144—41 |

DONALD R. SCHRAN, *Primary Examiner.*